US012480688B2

(12) United States Patent
Gracia Inglés

(10) Patent No.: US 12,480,688 B2
(45) Date of Patent: Nov. 25, 2025

(54) FASTENING SYSTEM FOR FASTENING A CASING TO A TUBE

(71) Applicant: SOLTEC INNOVATIONS, S.L., Molina de Segura (ES)

(72) Inventor: José Ángel Gracia Inglés, Murcia (ES)

(73) Assignee: SOLTEC INNOVATIONS, S.L., Molina de Segura (ES)

( * ) Notice: Subject to any disclaimer, the term of this patent is extended or adjusted under 35 U.S.C. 154(b) by 701 days.

(21) Appl. No.: 17/780,513

(22) PCT Filed: Nov. 25, 2020

(86) PCT No.: PCT/ES2020/070719
§ 371 (c)(1),
(2) Date: Nov. 18, 2022

(87) PCT Pub. No.: WO2021/105536
PCT Pub. Date: Jun. 3, 2021

(65) Prior Publication Data
US 2023/0221043 A1    Jul. 13, 2023

(30) Foreign Application Priority Data
Nov. 29, 2019   (EP) ..................................... 19383065

(51) Int. Cl.
*H02S 20/32*     (2014.01)
*F24S 30/425*    (2018.01)
*F24S 25/60*     (2018.01)

(52) U.S. Cl.
CPC ..... *F24S 30/425* (2018.05); *F24S 2025/6002* (2018.05); *F24S 2025/6007* (2018.05)

(58) Field of Classification Search
None
See application file for complete search history.

(56) References Cited

U.S. PATENT DOCUMENTS 10,536,109 B2 *   1/2020   Corio .................... F24S 30/425
12,003,206 B2 *   6/2024   Pedlar .................... H02S 20/23
(Continued)

FOREIGN PATENT DOCUMENTS

EP         3153793 A1      4/2017
WO    WO-2014078205 A1 *  5/2014   .............. F24S 23/71

OTHER PUBLICATIONS

International Search Report for patent application PCT/ES2020/070719 issued by the European patent Office and mailed Feb. 11, 2021, in English.
(Continued)

*Primary Examiner* — Steven M Marsh
(74) *Attorney, Agent, or Firm* — Shakir Law PLLC; Hassan Abbas Shakir

(57) ABSTRACT

A system for fastening a casing to a tube which, according to a first aspect of the invention, includes a claw provided with protuberances, and, according to a second aspect of the invention, comprises an incorporation of first rails on side faces of the casing, and second rails on an upper face of the casing to hook onto the protuberances. The claw can pivot with respect to the first protuberances, both to house the tube and to hook onto the second rail, as well as to surround and press against the tube, once the second rail is hooked. The fastening system allows for a faster and more ergonomic fastening without the use of tools and elements such as connecting screws and bolts.

14 Claims, 5 Drawing Sheets

(56) References Cited

U.S. PATENT DOCUMENTS

| | | | |
|---|---|---|---|
| 2011/0284055 A1* | 11/2011 | Almogy | F24S 30/425 |
| | | | 136/246 |
| 2015/0200621 A1 | 7/2015 | Reed | |
| 2017/0294867 A1 | 10/2017 | Pesce | |
| 2019/0036474 A1* | 1/2019 | Schuit | H02S 20/23 |
| 2025/0088135 A1* | 3/2025 | Yang | F24S 25/634 |

OTHER PUBLICATIONS

Written Opinion by the International Searching Authority for patent application PCT/ES2020/070719 issued by the European Patent Office and uploaded to WIPO Patentscope Jun. 3, 2021.

* cited by examiner

FASTENING SYSTEM FOR FASTENING A CASING TO A TUBE

CROSS-REFERENCE TO RELATED APPLICATIONS

This application is a national stage under 35 U.S.C. § 371 of PCT patent application PCT/ES2020/070719 filed on 25 Nov. 2020, which is pending and which is hereby incorporated by reference in its entirety for all purposes. PCT/ES2020/070719 claims priority to European Patent Application 19383065.0 filed 29 Nov. 2019, which is hereby incorporated by reference in its entirety for all purposes.

TECHNICAL FIELD OF THE INVENTION

The present invention lies within the field of control systems, and more specifically the area of fastening control systems. Furthermore, more precisely, the invention relates to the sector of solar energy. In particular, the invention relates to a fastening system for fastening a casing, such as an electrical casing, to a tube, and is especially designed to fasten an electrical casing for the control of a solar tracker to a torque tube of a solar tracker.

BACKGROUND OF THE INVENTION (STATE OF THE ART)

A solar tracker with elevated tracking provides a variable tilt to an assembly of solar panels on which it acts by means of rotation on a rotational shaft oriented, on a plane, in a north/south direction to compensate for the variable height of the Sun with respect to the Earth. Along the direction of the rotational shaft, the solar tracker has a torque structure to withstand the torsional stresses caused by rotation, which can have different configurations, such as a torque tube, torque box, etc.

The solar tracker additionally incorporates electrical and electronic components to control the operation of the tracker and are generally referred to as "the electronics of the tracker". The electronics of the tracker are enclosed, for safety reasons, in casings known as "enclosures", such as wiring enclosure boxes or electrical cabinets, which are installed throughout the solar facility for which the tracker is used. In some cases, for instance, when the torque structure is configured in accordance with a torque tube, the casings, or the enclosure for the electronics of the tracker can be fastened to the torque tube by means of connections, which involves the use of screws and nuts, thereby making the assembly and disassembly thereof more time-consuming.

BRIEF DESCRIPTION OF THE INVENTION

The present invention allows a casing to be fastened to the lower portion of a tube in a stable manner and makes the assembly and disassembly thereof quick and easy by means of a combination of claws, on the one hand, and rails, on the other hand, configured in the casing, as will be explained below.

In particular, the invention relates to a fastening system that allows the casing to be fastened to a tube, wherein the system envisages, according to a first aspect of the invention, an adjustment claw and, according to a second aspect of the invention, a particular configuration of the casing, each one of which has a configuration provided with corresponding features in order to facilitate an interconnection of the adjustment claw to the casing and to the tube. Likewise, another aspect of the invention is made up of a mounted assembly comprising the casing, the tube and a plurality of claws that connect the casing to the tube.

The use of the fastening system of the present invention allows for the fastening of the casings, in particular, the enclosures, for example, electrical enclosures, to tubes in such a manner that, without losing robustness, the assembly and, if applicable, the disassembly, can be done quickly.

BRIEF DESCRIPTION OF THE FIGURES

The previously mentioned advantages, as well as other advantages and features of the present invention, will be more thoroughly understood by referring to the following detailed description of preferred embodiments in relation to the attached figures, which shall be understood as merely illustrations, not limitations, wherein.

DETAILED DESCRIPTION OF A PREFERRED EMBODIMENT OF THE INVENTION

Figure 1:
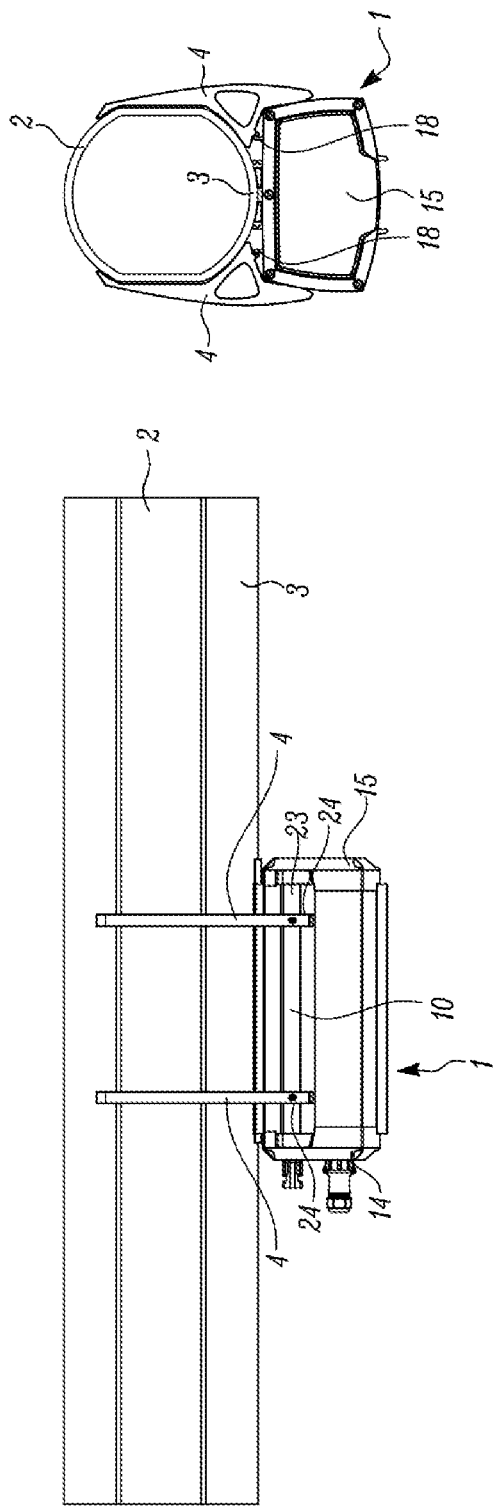
FIG. 1 shows a side profile view and a front view of a tube fastened to an electrical enclosure-type casing by means of the fastening system of the invention.

A detailed description of a preferred embodiment of the connection system of a casing (1) to a tube (2) object of the present invention, as shown in FIG. 1, is provided below, with the help of the aforementioned FIGS. 1-6.

The tube (2) to which the casing (1) is intended to be fastened has a lower portion wherein a convex curved portion (3), circular for example, is defined.

The tube (2) preferably has a cross section comprising two circular portions that are connected by two parallel straight portions placed between the circular portions, wherein the tube (2) is oriented such that the circular portions occupy the upper and lower portions of the tube (2).

The invention is especially intended to be used on solar trackers in order to fasten the casings (1), in particular casings (1) of the type known as enclosures, more specifically enclosures (1) for the electronics of solar trackers, to tubes (2) that make up the torque shaft of the tracker.

Figure 2:
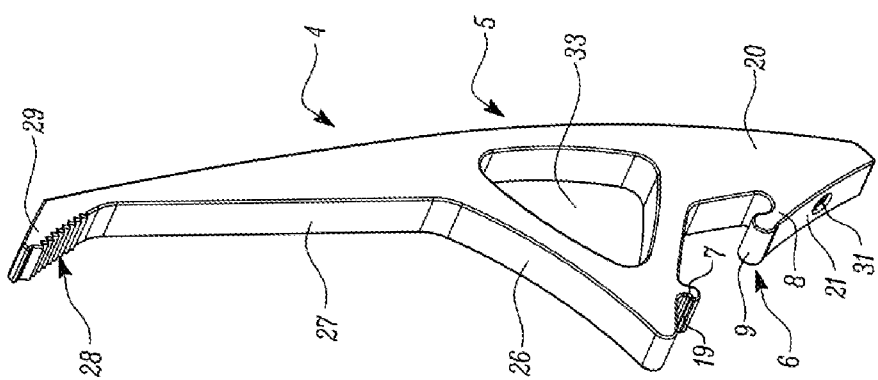
FIG. 2 shows a detailed perspective view of an adjustment claw that forms part of the first aspect of the fastening system of the invention.

The connection system of the present invention comprises a plurality of adjustment claws (4), as shown in FIG. 2, intended to be placed between the tube (2) and the casing (1), and which are configured, as will be further explained below, to, at the upper portion thereof, clasp the tube (2), and at the lower portion thereof, hook onto rails (10, 18) defined on the casing (1). To this end, each adjustment claw (4) comprises a claw body (5), provided with a lower portion intended to hook onto the casing (1), and an upper portion intended to clasp the tube (2).

On the lower portion, a first protuberance (6) and a second protuberance (7) project from the claw body (5). The first protuberance (6) has a proximal portion (8) which projects upward from the claw body (5), and a distal portion (9) as an extension of the proximal portion (8) and with larger dimensions than those of the proximal portion (8), and is in the shape of a bulb. According to the foregoing explanation, the first protuberance (6) narrows in the proximal area (8) and bulges in the distal area (9). The configuration of the first protuberance (6) allows the adjustment claw (4) to remain suspended, in a pivotable manner, on a first rail (10) of the casing (1) by the first protuberance (6), by means of a form closure according to the following explanation.

Figure 3:
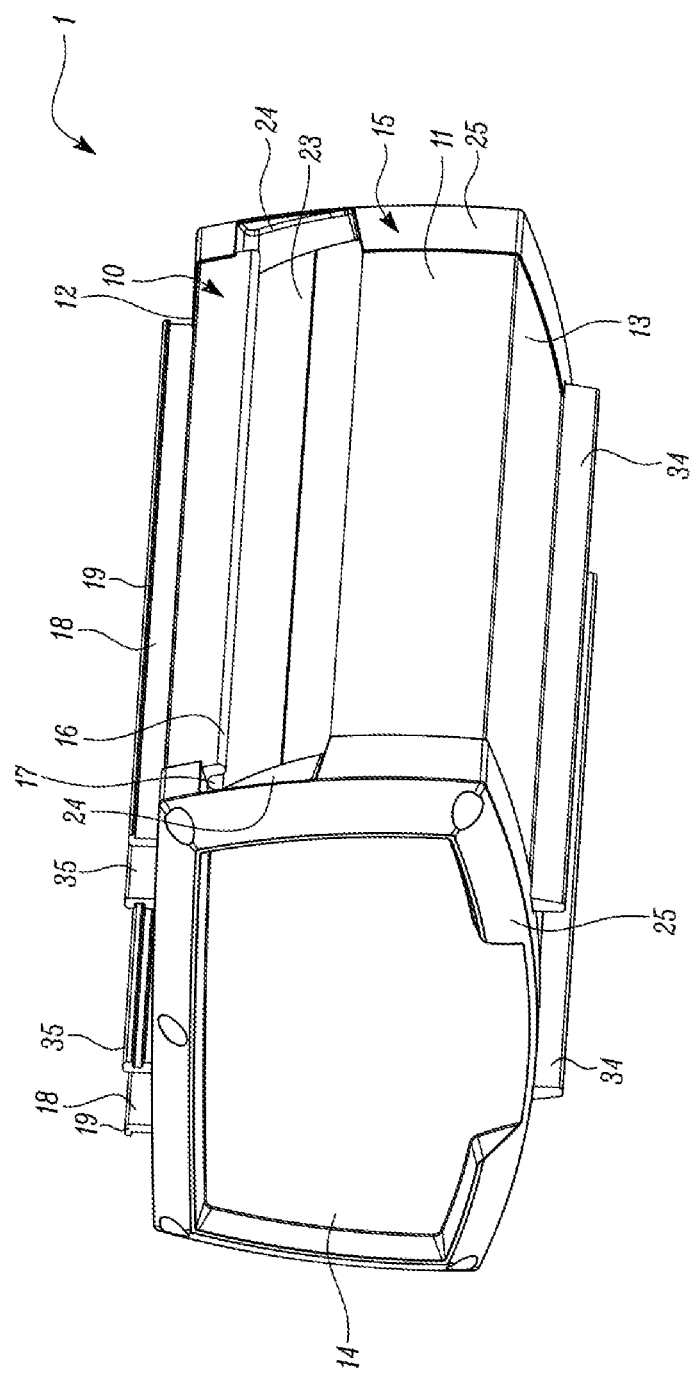
FIG. 3 shows a detailed perspective view of an enclosure-type casing according to the present invention.

The casing (1), as shown in FIG. 3, comprises a casing body which is essentially in the shape of a box, having: two side faces (11) an upper face (12), a lower face (13) and two end faces, front (14) and rear (15). The first rail (10), mentioned previously, which comprises a rail body (16), located at a distal position with respect to the casing body, and which runs longitudinally between the end faces (14, 15), projects upperly from each one of the two side faces (11) of the casing body. The first rail (10) further includes a longitudinal groove (17) in the rail body (16) in a proximal position with respect to the casing body, and which is hidden by the rail body (16). The groove (17) is configured to house the first protuberance (6) by means of a form closure, allowing the adjustment claw (4) to remain suspended from the casing (1). To this end, the configuration of the groove (17) is opposite and complementary to that of the first protuberance (6). In particular, the first groove (17) has the shape of a bulb with a bulge closer to the casing body and has a narrow shape farther from the casing body.

As was previously mentioned in relation to FIG. 2, a second protuberance (7) also projects from the lower portion of the claw body (5), located at a higher level with respect to the first protuberance (6), and which is configured to hook onto a second rail (18), due to the fact that, as was previously indicated, the claw body (5) is pivotable around the first protuberance (6) when the adjustment claw (4) is suspended from the first rail (10) by means of the first protuberance (6), as will be further explained below.

Figure 5:
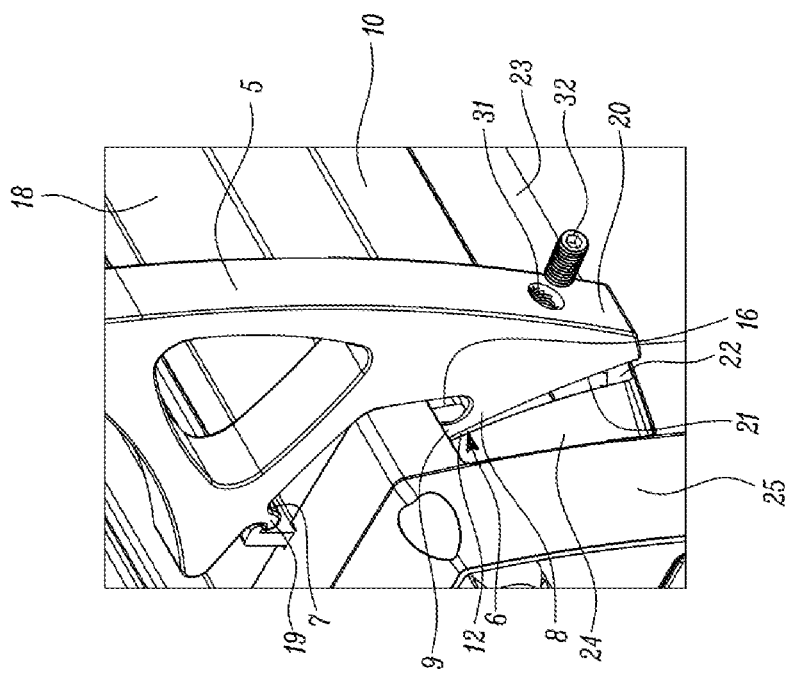
FIG. 5 shows a detailed perspective view of the connection of the second protuberance of the adjustment claw with the second rail of the casing.

The two previously mentioned second rails (18), as shown in FIG. 3, project upwards from the upper face (12) of the casing body and run long longitudinally between the end faces (14, 15), each second rail (18) in correspondence with one of the side faces (11) of the enclosure body. The second rails (18) are configured to hook onto the second protuberance (7). For example, as shown in FIG. 5, each second protuberance (7) and the corresponding second rail (18) thereof can have corresponding hook forms (19).

To enable the adjustment claw (4) to pivot on the first protuberance (6), the claw body (5) can have, on the lower portion thereof, a lower end (20) which includes a contact surface (21) with a concave configuration, which starts from the first protuberance (6) and extends downwards, moving distally further away both from the first protuberance (6) and the second protuberance (7), creating a pivot space (22) that enables the claw body (5) to be able to pivot on the first protuberance (6). Likewise, in order to allow the second protuberance (7) to hook onto the second rail (18) when the adjustment claw (4) is suspended from the first rail (10) by means of the first protuberance (6), the second protuberance (7) is located in a more distal position of the claw body (5) with respect to the first protuberance (6). In a corresponding fashion, the casing (1) is also configured to enable pivotability. In particular, the side faces (11) of the casing body have a convex segment (23) below the first rail (10) in correspondence with the pivot space (22) and the contact surface (21).

Figure 4:
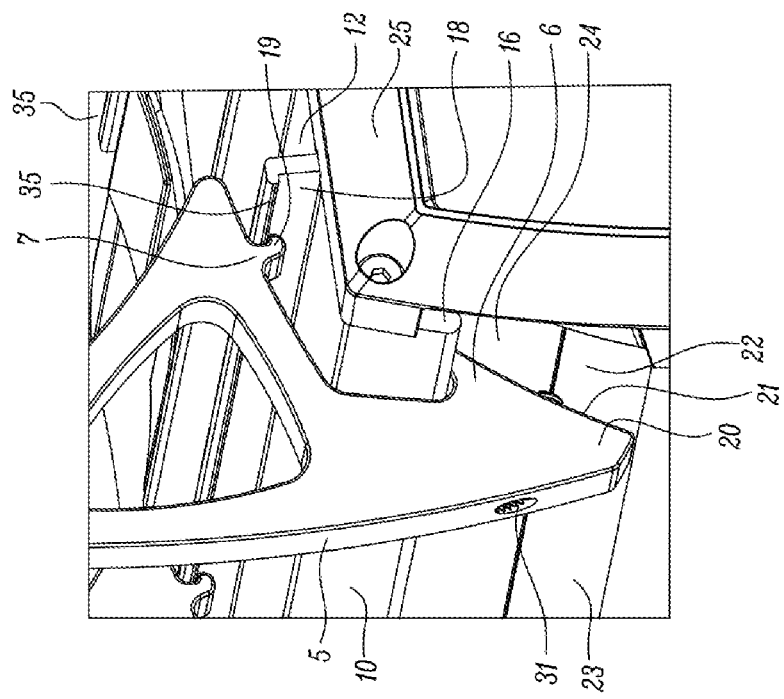
FIG. 4 shows a detailed perspective view of the connection of the first protuberance of the adjustment claw with the groove of the first rail of the casing.

To hook the first protuberance (6) inside the first rail (10), there are several possibilities. A less preferred possibility implies elastic deformation, forcing the bulge of the distal portion (9) of the first protuberance (6) to reach the groove (17) through the groove (17), which is narrower. This possibility is not viable if either the casing (1) or the first protuberance (6) are parts that, due to the material or configuration thereof, are not deformable by the manual force of an operator. For these cases, a more preferable possibility, as illustrated in FIG. 4, is to laterally insert the first protuberance (6) in the groove (17). To do so, the casing body incorporates openings (24) that allow the first protuberance (6) to be housed in a position from which the groove (17) is accessible. We will now discuss the location of the openings (24).

The openings (24) can be arranged on the side face (11) corresponding to each first rail (10) if the first rail (10) is interrupted creating different segments, or if the first rail (10) is not interrupted in segments, but is not extended to the end faces (14, 15). When the first rail (10) is not interrupted in segments, and also reaches at least one of the end faces (14, 15), openings (24) are made in covers (25), generally made of plastic, which cover the casing (1), on the end faces (14, 15).

As indicated above, the claw body (5) also has an upper portion, configured to clasp the tube (2). In this sense, the upper portion of the claw body (5) has a lower concave portion (26) in correspondence with the lower convex portion (3) of the tube (2), and also has an intermediate portion (27) configured according to the form of the tube (2) and which, in the figures, is straight, given that the tube (2) shown has a straight form at the intermediate portion thereof. Lastly, the upper portion of the claw body (5) has an upper portion (28) with a contact end (29) angled towards the inside. The purpose of the contact end (28) is to help support the weight of the casing (1) when the tube (2) is already clasped by the claws (4), as will be further explained below. At this moment, the casing (1) is sufficiently fastened to the tube (2) in order for the operator to be able to let go of the casing (1) without the risk of it falling.

To create a more robust fit between the tube (2) and the adjustment claw (4), separation means (31, 32) can be used, placed between the contact surface (21) of the lower portion and the side face (11) of the casing body. The separation means (31, 32) preferably comprise a threaded through hole (31), made on the lower end (20) of the claw body (5), and through which a screw (32) can be inserted, being screwed in from the outside. When the screw (32) advances through the hole (31), it makes contact with the side face (11) of the casing body, making the adjustment claw (4) pivot on the first protuberance (6) such that when the advancement of the screw (32) continues, the upper portion (28) of the upper portion of the claw body (5) presses against the tube (2), further helping the contact end (29) support the weight of the casing (1).

In the lower portion (26) of the upper portion of the claw body (5) there can be a hollow (33), preferably a through hollow, to reduce the weight of the adjustment claw (4) and facilitate the handling by the operator.

The adjustment claw (4) is preferably an integrally configured element, meaning that the entire claw body (5), the upper portion, lower portion, protuberances (6, 7) and contact end (29) thereof form a single part.

On the lower face (13) of the casing body, two third rails (34) are arranged to facilitate the stacking of the casing (1) or of the casing bodies, improving the efficiency in the transportation thereof. In particular, when the casing (1) or a casing body is resting on another casing (1) or another casing body arranged below, the third rails (34) are located next to the second rails (18) of the casing (1) or casing body that is below, or next to the fourth rails (35) which are also arranged, in correspondence, on the upper face of the casing (1), preventing a relative lateral movement between the two casings (1) or the two casing bodies. The fourth rails (35) can be located to facilitate support points to the tube (2) when it is mounted on the casing (1). The figures show that the third rails (34) are more separated from one another than the fourth rails (35), and therefore the fourth rails (35), in a stacked position, remain inside the third rails (34), although the opposite embodiment is also envisaged by the invention. On the other hand, in the embodiment shown, the fourth rails (35) are included, although alternatively the second rails (18), as stated previously, can be the ones that cooperate with the third rails (34) without the need to include the fourth rails (35).

The casing body is preferably made of aluminium, at least the side faces (11), the upper face (12) and the lower face (13) thereof. The use of aluminium provides the following advantages:

- Greater structural rigidity than plastic, which prevents the deformation of the casing (1) when being mounted. This is especially important in the case of casings (1) wherein inclinometers, accelerometers and, in general the means for measuring the orientation of the solar tracker are housed, given that a deformation of the casing (1) distorts the measurement of the slope.
- Less weight than other metal materials.
- Allows for manufacturing by means of extrusion, avoiding casting moulds.
- Reduces the thermal gradient between the outside and the inside of the enclosure.
- It is used as a dissipator for the electronic components housed therein.
- It allows for a simpler connection to ground between the electronic elements and the mechanical structure of the tracker (with hardly the need for any additional elements, such as grounding screws or cabling).

To show the usefulness of the present invention in greater detail, a method by which the adjustment claw (4) is used to connect the casing (1) to the tube (2) is described below.

The operator first suspends at least one adjustment claw (4) on each of the two first rails (10), housing the corresponding first protuberance (6) in the groove (17) of the first rail (10), as was previously explained. More preferably, four adjustment claws (4) are used; two for each one of the first rails (10).

Then the casing (1) with the suspended adjustment claws (4) is moved from the bottom thereof to the lower portion of the tube (2) until the contact end (26) of the adjustment claws (4) makes contact with the lower portion (3) of the tube (2), such that by pivoting the adjustment claws (4) on the first protuberances (6), the second protuberance (7) of each one of the adjustment claws (4) is hooked to the corresponding second rail (18) of the casing body and, then the tube (2) is housed inside the upper portion of the claws.

Lastly, the separation means (31, 32) are actuated so that the adjustment claw (4) pivots on the first protuberance (6) and the upper portion of the adjustment claws (4) presses against the tube (2). Preferably, the screw (32) housed in the hole (31) of the adjustment claws (4) is tightened to allow the upper portion of the adjustment claws (4) to press against the tube (2). The screw (32) can be inserted in the hole (31) after the second protuberance (7) is hooked to the second rail (18), although it can also be previously threaded before suspending the adjustment claws (4).

Figure 6:
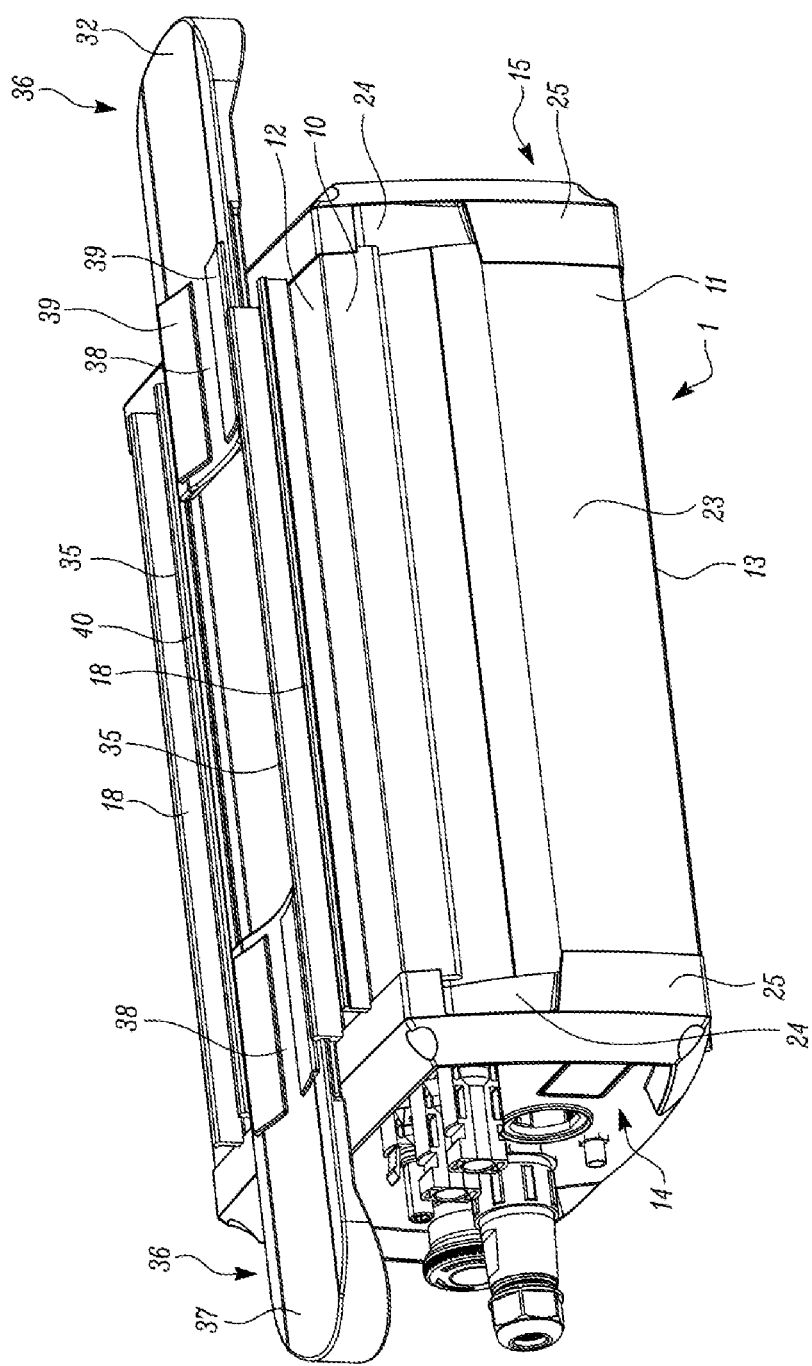
FIG. 6 shows a perspective view of the casing with the auxiliary parts assembled.

To facilitate the mounting, two auxiliary parts (36) can be used, as shown in FIG. 6, which comprise a first end with a handle (37) and a second end (38) that is magnetised. The auxiliary parts (36) are housed between the second rails (18) or, if applicable, between the fourth rails (35), being magnetically fastened to the upper face (12) of the casing (1), and projecting from the front (14) and rear (15) end faces. When the casing (1) with the suspended adjustment claws (4) is lifted to the tube (2), the auxiliary parts (36) are already mounted, either because they were mounted before suspending the adjustment claws (4) or because they were mounted after suspending the adjustment claws (4). The auxiliary parts (36) likewise exert a magnetic force on the tube (2), which keeps the tube (2) joined to the casing (1) while the separation means (31, 32) are used. Once the separation means (31, 32) are used, the auxiliary parts (36) can be removed by pulling the handles (37), or they can be kept in place to increase the magnetic fastening between the casing (1) and the tube (2). The auxiliary parts (36) are preferably configured to adapt to the shape of the lower portion (3) of the tube (2) to thus increase the magnetic fastening of the tube (2) to the casing (1).

By way of example, the handle (37) has a change in cross section which facilitates the handling thereof, as can be seen in FIG. 6. On the other hand, the second end (38) of the handle (36) can include magnets (39), as can likewise be seen in FIG. 6. Furthermore, the second rails (18), or if applicable, the fourth rails (35), can include grooves (40) to house the auxiliary parts (36) (see FIG. 6).

The invention claimed is:

1. A system for fastening a casing to a tube, comprising:
an adjustment claw provided with a claw body with: a lower portion intended to hook onto the casing, and an upper portion intended to clasp the tube; wherein the following elements project from the claw body at a lower portion thereof:
   a first protuberance with: a proximal portion which projects upwards from the claw body, and a distal portion as an extension of the proximal portion, and with greater dimensions than the proximal portion, the first protuberance narrowing in a proximal area and bulging in a distal area to allow the adjustment claw to remain suspended from a first rail of a side face of a casing body of the casing by the first protuberance, by means of a form closure, in a pivotable way; and
   a second protuberance located at a higher level with respect to the first protuberance, and which is configured to hook to a second rail, located on an upper face of the casing body of the casing by means of the pivoting of the claw body on the first protuberance when the adjustment claw is suspended from the first rail by means of the first protuberance; and
wherein the upper portion of the claw body has a concave lower portion to house a convex lower portion of the tube, and further has an intermediate portion to adapt to a form of the tube; and an upper portion with a contact end angled toward an inside, intended to support a weight of the casing when the tube is housed in the claw.

2. The fastening system according to claim 1, wherein the lower portion of the claw body has a lower end which includes a contact surface with a concave configuration, which starts from the first protuberance and extends downwards, moving distally further away from both the first protuberance and the second protuberance, creating a pivot space that facilitates the pivoting.

3. The fastening system according to claim 1, wherein the second protuberance is located in a more distal position of the claw body with respect to the first protuberance in order to allow the second protuberance to hook into the second rail by means of the pivoting.

4. The fastening system according to claim 2, wherein it comprises separation means placeable between the contact surface and the side face of the casing body in order to produce a pivoting of the adjustment claw on the first protuberance so that the upper portion of the claw body clasps the tube.

5. The fastening system according to claim 4, wherein the separation means comprise:
   a threaded through hole, made in the lower end of the lower portion of the claw body, and
   a screw threaded on the outside thereof, intended to be housed in the hole to make contact with the side face of the casing body, making the upper portion of the claw body press against the tube.

6. A system for fastening a casing to a tube, comprising:
   a casing, that includes a casing body with two side faces and an upper face, wherein a first rail projects from each of the two side faces, the first rail comprising:
      a rail body, located in a distal position with respect to the casing body, and which runs longitudinally; and
      a longitudinal groove made on the rail body in a proximal position with respect to the casing body, and hidden by the rail body, and which is configured with a bulge and a narrowing in an opposite and complementary manner with respect to a first protuberance of the fastening system to house the first protuberance by means of a form closure and to allow the adjustment claw to be suspended on the casing,
   wherein second rails project upwards from the upper face of the casing body and run longitudinally, each second rail in correspondence with each one of the side faces of the casing body, and which are configured to hook onto a second protuberance by means of a pivoting of the adjustment claw when it is suspended by the first protuberance.

7. The fastening system according to claim 6, wherein the side faces of the casing body have a convex segment below the first rail in correspondence with a pivot space and a contact surface in order to allow pivoting.

8. The fastening system according to claim 6, wherein that the casing includes openings to house the first protuberance in a position from which the groove is laterally accessible.

9. The fastening system according to claim 8, wherein the casing comprises coverson the ends of the side faces, wherein the openings are made in the covers.

10. The fastening system according to claim 6, wherein the casing body additionally comprises a lower face with third rails, which are configured so that when a casing body is resting on another casing body, the third rails are located next to the second rails of the casing body which is below, or next to fourth rails also arranged, in correspondence, on the upper face of the casing body, blocking relative lateral movements between both casing bodies.

11. The fastening system according to claim 10, wherein the fourth rails are located to facilitate support points to the tube when it is mounted on the casing.

12. The fastening system according to claim 6, wherein it additionally comprises two auxiliary parts comprising a first end with a handle and a magnetised second end, the auxiliary parts being intended to be housed between the fourth rails, the auxiliary parts being magnetically fastened to the upper face of the casing, and projecting from the front and rear end faces to magnetically attract the tube.

13. The fastening system according to claim 6, wherein at least the side faces, the upper face and the lower face of the casing body are made of aluminium.

14. A tube and casing assembly, the assembly comprising at least two adjustment claws;
   a casing that includes a casing body with two side faces and an upper face; and
   a tube fastened to the casing by means of the at least two adjustment claws,
   wherein one adjustment claw of the at least two adjustment claws is provided with a claw body with: a lower portion intended to hook onto the casing, and an upper portion intended to clasp the tube; wherein the following elements project from the claw body at a lower portion thereof:
      a first protuberance with: a proximal portion which projects upwards from the claw body, and a distal portion as an extension of the proximal portion, and with greater dimensions than the proximal portion, the first protuberance narrowing in the proximal area and bulging in the distal area to allow the one adjustment claw of the at least two adjustment claws to remain suspended from a first rail of a side face of a casing body of the casing by the first protuberance, by means of a form closure, in a pivotable way; and
      a second protuberance located at a higher level with respect to the first protuberance, and which is configured to hook to a second rail, located on an upper face of the casing body of the casing by means of the pivoting of the claw body on the first protuberance when the first adjustment claw is suspended from the first rail by means of the first protuberance; and
   wherein the upper portion of the claw body has a concave lower portion to house a convex lower portion of the tube, and further has an intermediate portion to adapt to the form of the tube; and an upper portion with a contact end angled toward an inside, intended to support a weight of the casing when the tube is housed in the one adjustment claw of the at least two adjustment claws.

* * * * *